United States Patent
Pfeifer et al.

(10) Patent No.: US 8,719,224 B2
(45) Date of Patent: May 6, 2014

(54) COMMON MODELING OF DATA ACCESS AND PROVISIONING FOR SEARCH, QUERY, REPORTING AND/OR ANALYTICS

(75) Inventors: Wolfgang Pfeifer, Kerzenheim (DE); Gerrit Simon Kazmaier, Metzingen (DE); Baré Said, Saint Leon-Röt (DE); Jan Teichmann, Neustadt/Weinstrasse (DE)

(73) Assignee: SAP AG, Walldorf (DE)

( * ) Notice: Subject to any disclaimer, the term of this patent is extended or adjusted under 35 U.S.C. 154(b) by 469 days.

(21) Appl. No.: 12/847,409

(22) Filed: Jul. 30, 2010

(65) Prior Publication Data
US 2012/0030256 A1   Feb. 2, 2012

(51) Int. Cl.
*G06F 17/30* (2006.01)

(52) U.S. Cl.
USPC ............. 707/626; 707/803; 707/999.004; 707/999.103

(58) Field of Classification Search
USPC .......... 705/7.11; 707/711, 736, 999.002, 707/999.003, 626, 638, 639, 803, 999.004, 707/999.101–999.103; 715/200
See application file for complete search history.

(56) References Cited

U.S. PATENT DOCUMENTS

| | | | |
|---|---|---|---|
| 6,418,448 B1 * | 7/2002 | Sarkar | 1/1 |
| 6,611,838 B1 * | 8/2003 | Ignat et al. | 1/1 |
| 7,818,662 B2 * | 10/2010 | Nene et al. | 715/224 |
| 8,458,201 B2 * | 6/2013 | Pollinger | 707/756 |
| 2009/0249446 A1 * | 10/2009 | Jenkins et al. | 726/3 |

* cited by examiner

*Primary Examiner* — Marc Filipczyk
(74) *Attorney, Agent, or Firm* — Buckley, Maschoff & Talwalkar LLC

(57) ABSTRACT

A system includes first metadata defining a business object object model, and second metadata defining a first object model to define a query on the business object object model. The first object model is an instance of a business object view metadata model, and the business object object model is an instance of a business object metadata model. In some aspects, a request is received to retrieve a result element associated with a query on a business object, the business object comprising an instance of a business object object model, and the business object is instantiated based on first metadata defining the business object object model. An instance of a business object view object model is instantiated based on second metadata defining the business object view object model, the instance of the business object view object model defining the query on the business object.

24 Claims, 15 Drawing Sheets

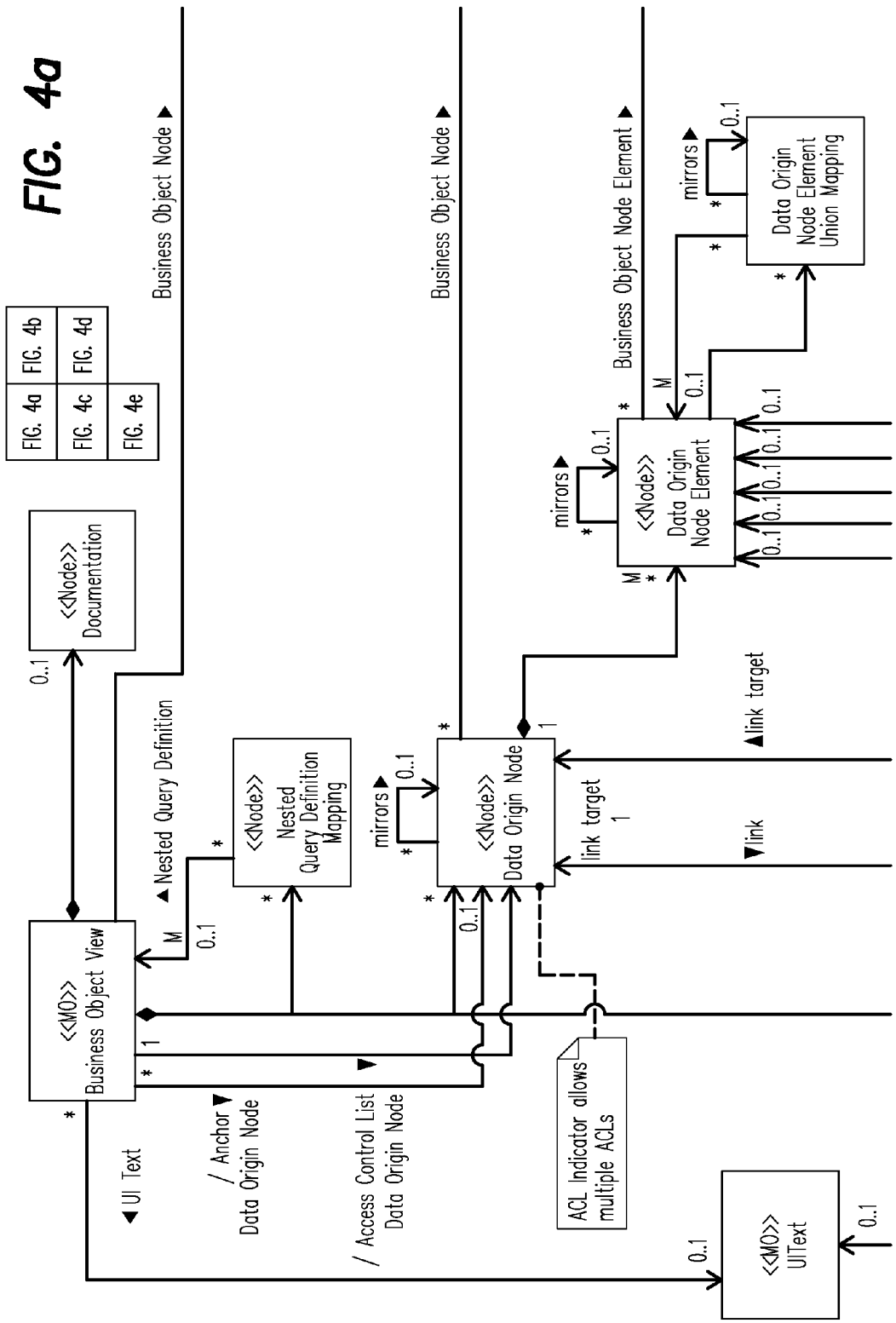

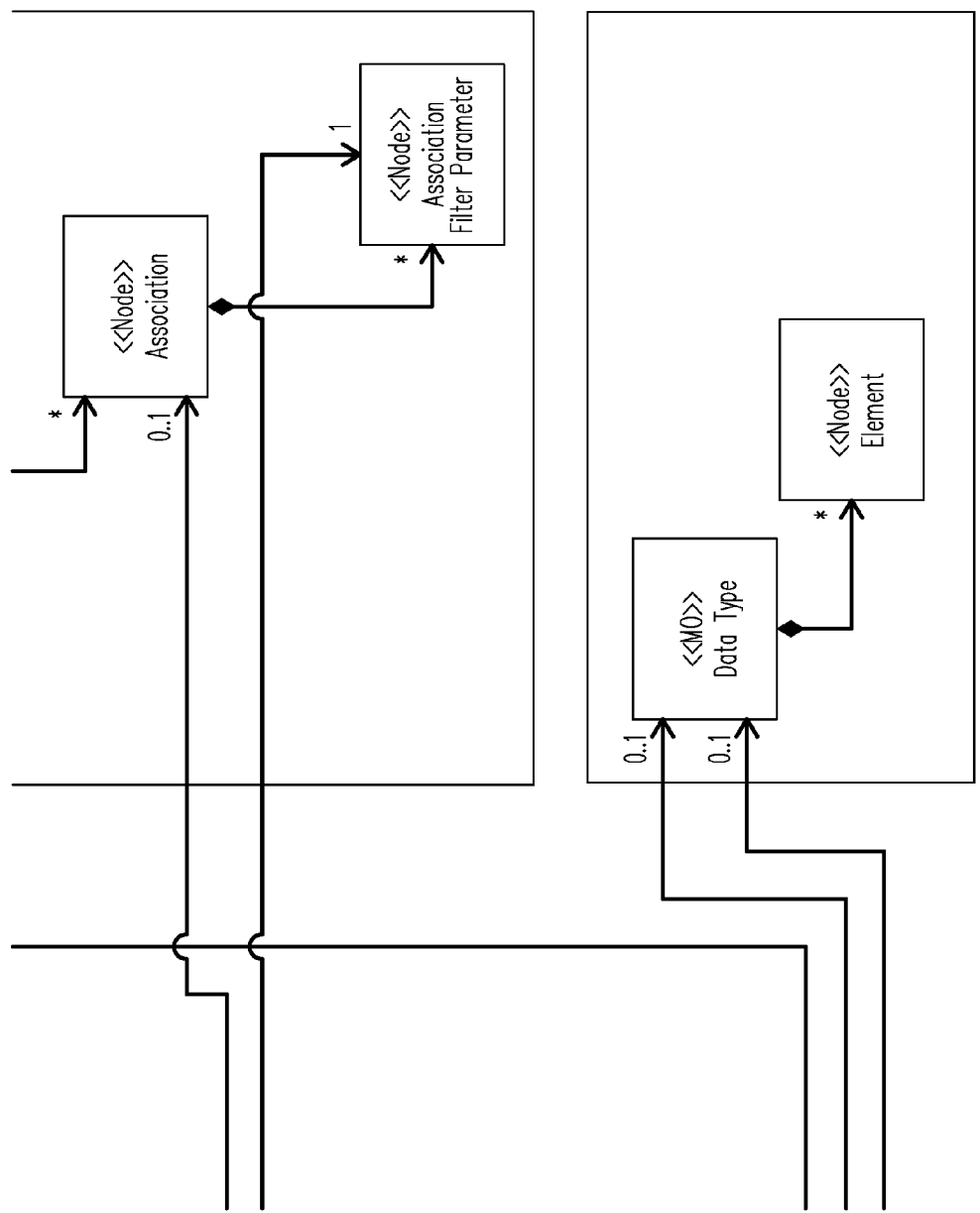

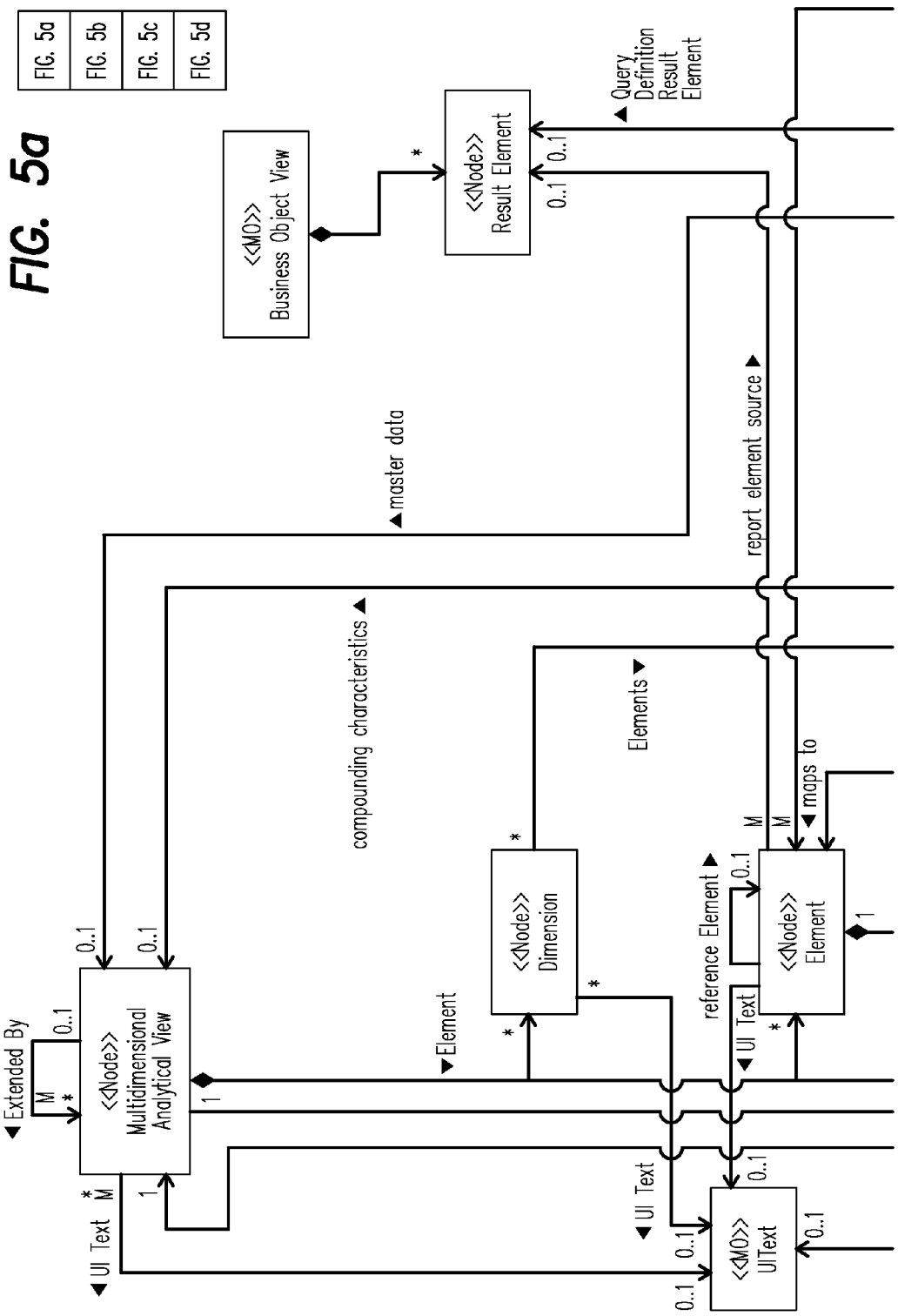

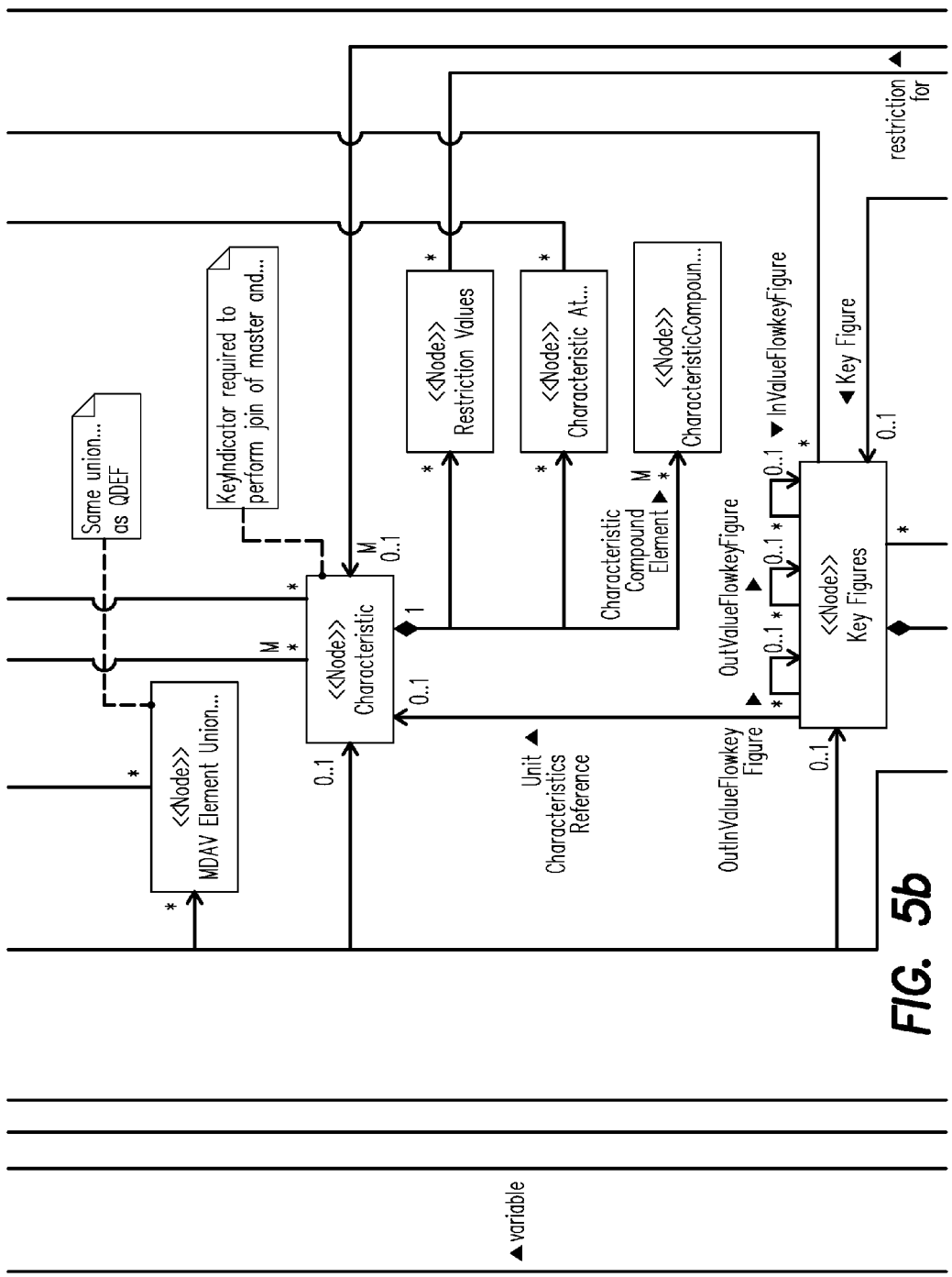

COMMON MODELING OF DATA ACCESS AND PROVISIONING FOR SEARCH, QUERY, REPORTING AND/OR ANALYTICS

FIELD

Some embodiments relate to enterprise services based on business objects and supported by an application platform. More specifically, some embodiments relate to modeling of queries on business objects to facilitate model-based search, query, reporting and/or analytics.

BACKGROUND

An application platform may implement metadata models to support different business solutions. Metadata models may include generic models of a business object, a floorplan (i.e., a user interface layout), user interface text, a process component, and a message type, among others. A business object, for example, is a software model representing real-world items used during the transaction of business. An instance of a business object metadata model may comprise a SalesOrder object model or an Organization object model. Instances of these object models, in turn, represent specific data (e.g., SalesOrder 4711, ACME corporation).

An instance of a business object metadata model (e.g., a SalesOrder object model) may specify business logic and/or data having any suitable structure. The structure may be determined based on the requirements of a business scenario in which the instance is to be deployed. A business application for a particular business scenario may require many business object object models, where the structure of each has been determined based on the requirements of the particular business scenario.

The data stored by an application platform is typically accessed according to one of two primary modalities. The first, which may be referred to as an operational modality, involves accessing and modifying the data during the day-to-day course of business. The operational modality may include, for example, reviewing and updating inventory, inputting sales figures, issuing paychecks based on salary and attendance data, etc.

An analytical modality, on the other hand, generally consists of strategic analysis of business data. Activities of the analytical modality may include comparison of profit margins by location, product and/or year, sales by brand, etc. Of course some activities may be arguably classified as belonging to either the analytical modality or the operational modality.

Separate tools are typically used for each modality. A software solution such as SAP Enterprise Suite® provides data queries, user interfaces and reports for presenting the data underlying business objects. These queries, interfaces and reports are developed by the solution provider based on a knowledge of the structure and semantics of the business objects. Customers and partners may customize or develop similar queries, interfaces and reports, based also on the business objects.

The analytical modality is generally served by Business Intelligence reporting tools, such as SAP BusinessObjects Crystal Reports®, or SAP BusinessObjects Web Intelligence®. Business Intelligence tools typically rely on a software abstraction layer that shields end users from the complexity of the physical tables. The abstraction layer allows end users to access business data stored in a database using intuitive terms rather than references to specific physical entities of the database.

The abstraction layer includes "business objects" which are different from those mentioned above. In particular, business objects of the abstraction layer may represent dimensions (i.e., along which an analysis or report may be performed), details (i.e., representing additional information on dimensions), and measures (i.e., representing indicators, most often numeric, whose values can be determined for a given combination of dimension values). In one example, a Sales measure may be used to determine the total sales for January (i.e., a value of the Month dimension) in France (i.e., a value of the Country dimension).

Systems to address the inefficiencies of the foregoing scenario are desired. In particular, the present inventors have discovered that advantages may result from providing one or more metadata models which facilitate model-based search, query, reporting and/or analytics.

DETAILED DESCRIPTION

Figure 1:
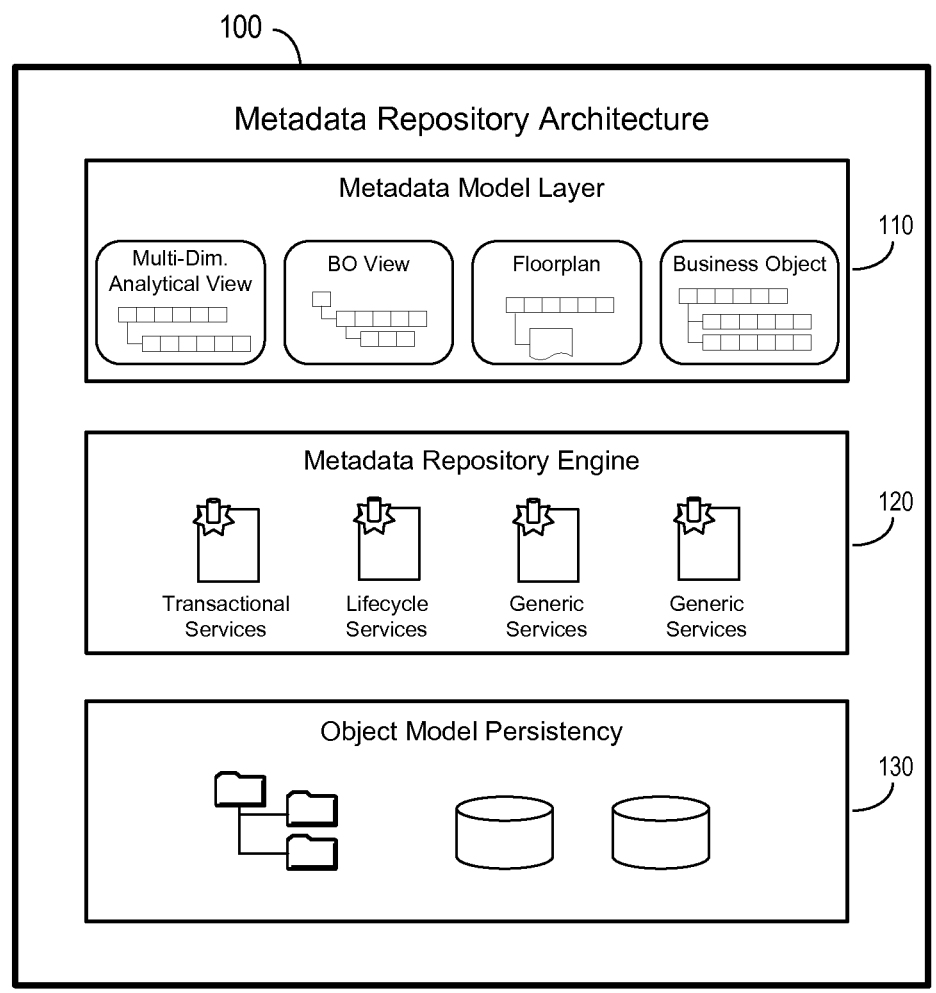
FIG. 1 is a general block diagram illustrating a metadata repository architecture according to some embodiments.

FIG. 1 is a block diagram of metadata repository architecture 100 according to some embodiments. FIG. 1 represents a logical architecture for describing some embodiments, and actual implementations may include more or different components arranged in any manner. Architecture 100 may be implemented using any number of computer devices, and one or more processors may execute program code to perform processes described herein. Architecture 100 may be implemented in an application platform based on SAP Netweaver®, but is not limited thereto.

Architecture 100 includes metadata model layer 110 including generic models of a floorplan, a business object, a business object view, and a multi-dimensional analytical view, but embodiments are not limited thereto. The business object view metadata model and the multi-dimensional analytical view metadata model are newly-introduced herein. In some embodiments, instances of the business object view metadata model define a query on an instance of the business object metadata model. Instances of the multi-dimensional analytical view metadata model define a view on a result node of an instance of the business object view metadata model. Detailed examples and usages thereof are provided below.

Other metadata models that may reside in metadata model layer 110 may describe, for example, a user interface text, a process component, a message type, a work center, and a UI text, but embodiments are not limited thereto. The metadata models of layer 110 may be embodied in any type of electronic data structure, including but not limited to eXtensible Markup Language files.

Each metadata model of layer 110 may comprise an instance of a same meta-metadata model. The meta-metadata model may consist of nodes, composite associations, associations, elements structure and attribute properties. Development of other metadata models and instances thereof (i.e., object models) may therefore proceed using the same development technologies, thereby facilitating integration of the various specific object models. In this regard, metadata model layer 110 may provide a facility to specify and persist logical dependencies between the metadata models. Moreover, access and lifecycle issues of the various specific metadata models and their instances may be managed using similar (or identical) mechanisms.

According to some embodiments, the meta-metadata model is identical to the business object metadata model. In other words, the business object metadata model may comprise an instance of itself.

Repository engine 120 includes transactional services to create and administrate metadata model instances, and lifecycle services to manage metadata model instances lifecycles. Metadata defining the metadata model instances (i.e., object models) are stored in object model persistency 130 in database tables and/or any other suitable format.

Figure 2:
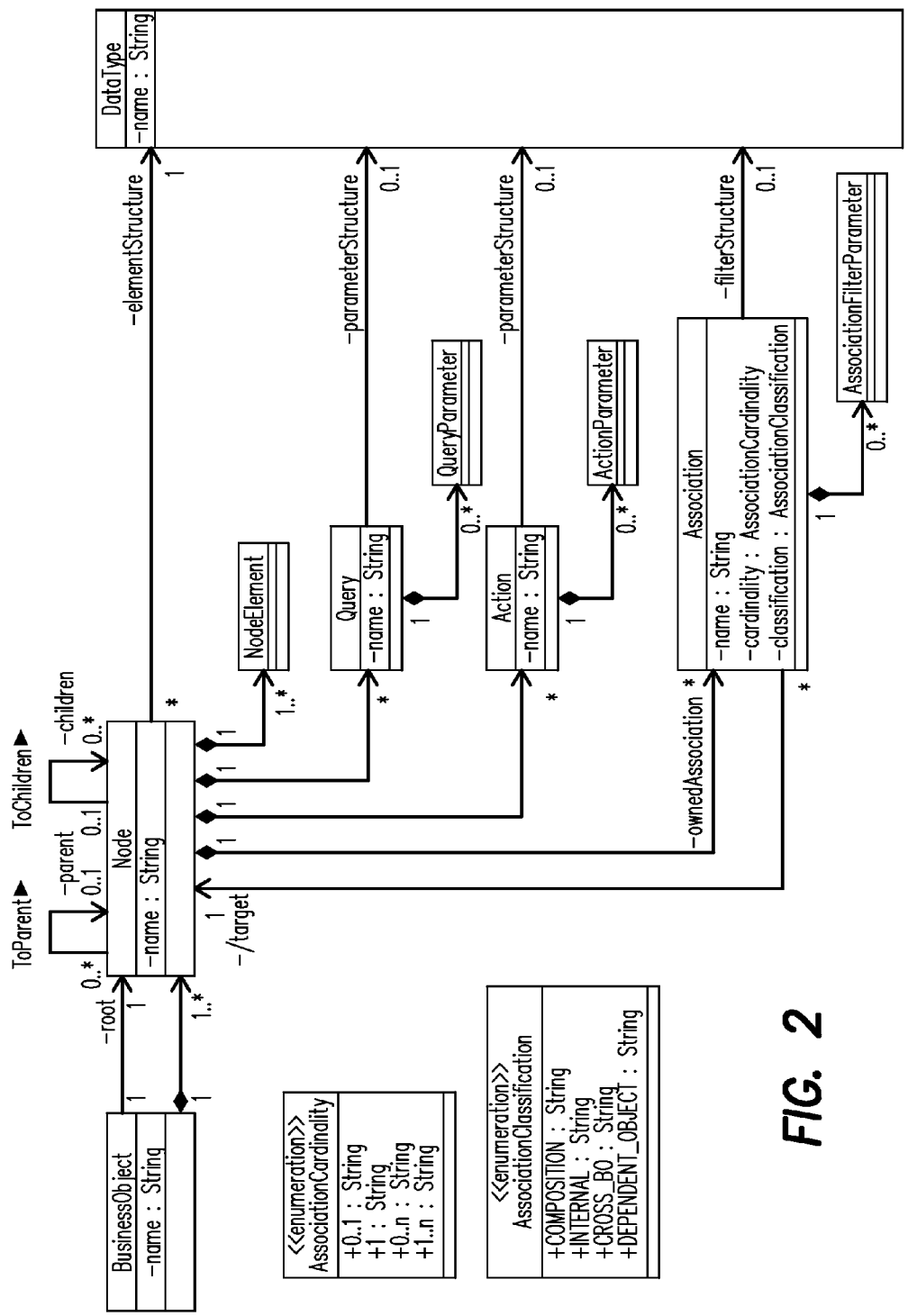
FIG. 2 is a diagram of a generic business object model according to some embodiments.

FIG. 2 is a block diagram of business object metadata model 200 according to some embodiments. Business object metadata model 200 is a tree-like structures including root node 210 and associated sub-nodes. Elements of the nodes and sub-nodes of a grandchild instance of model 200 (e.g., SalesOrder 4711) include the actual data desired during search, query, reporting and analytics based on the grandchild instance.

In addition to such data containers, business object metadata model 200 defines relations (i.e., associations) between nodes of itself and of other metadata model to reflect inherent dependencies within model layer 110. Also supported are actions to change a business object instance and node-based queries to search for instances of a node.

Figure 3:
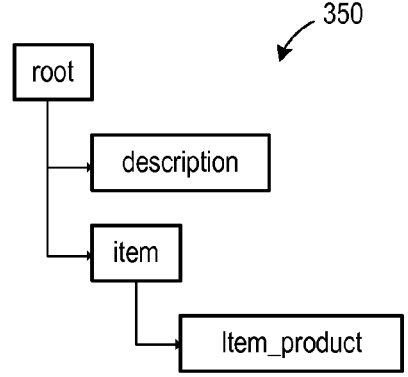
FIG. 3 is a diagram illustrating a query on a business object according to some embodiments.

According to standard reporting paradigms, a result set of data to be retrieved is first defined during design-time. This result set comprises a flat structure of elements, referred to herein as a Query Definition (QDef). FIG. 3 illustrates QDef 300, which refers to object model 350. QDef 300 specifies elements of various nodes of object model 350. In particular, QDef 300 specifies the node elements Item-ID and Item-amount from the item node of model 350, the node element Root-ID from the root node of model 350, the node element Description-text from the description node of model 350, and the node element Item_product-ID from the item-product node of model 350.

Figure 4B:
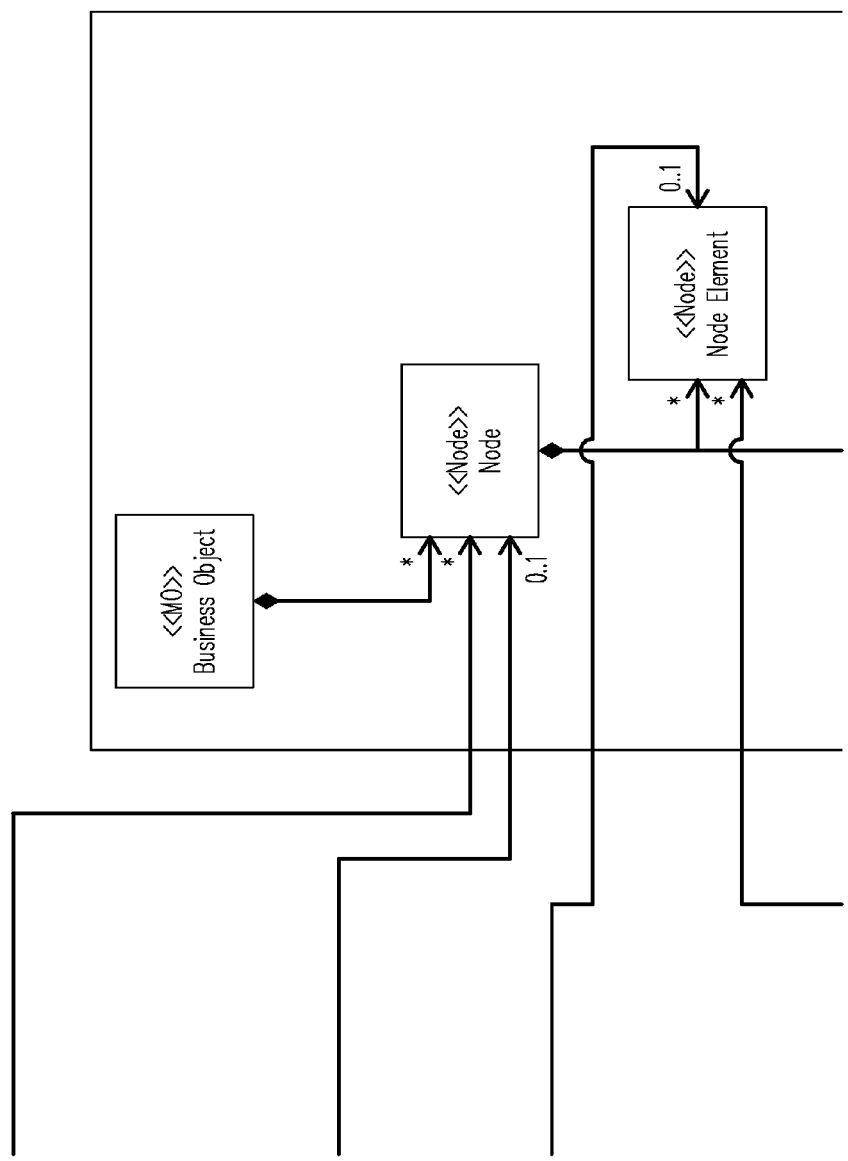
FIG. 4 is a diagram of a business object view object model according to some embodiments.
Figure 4C:
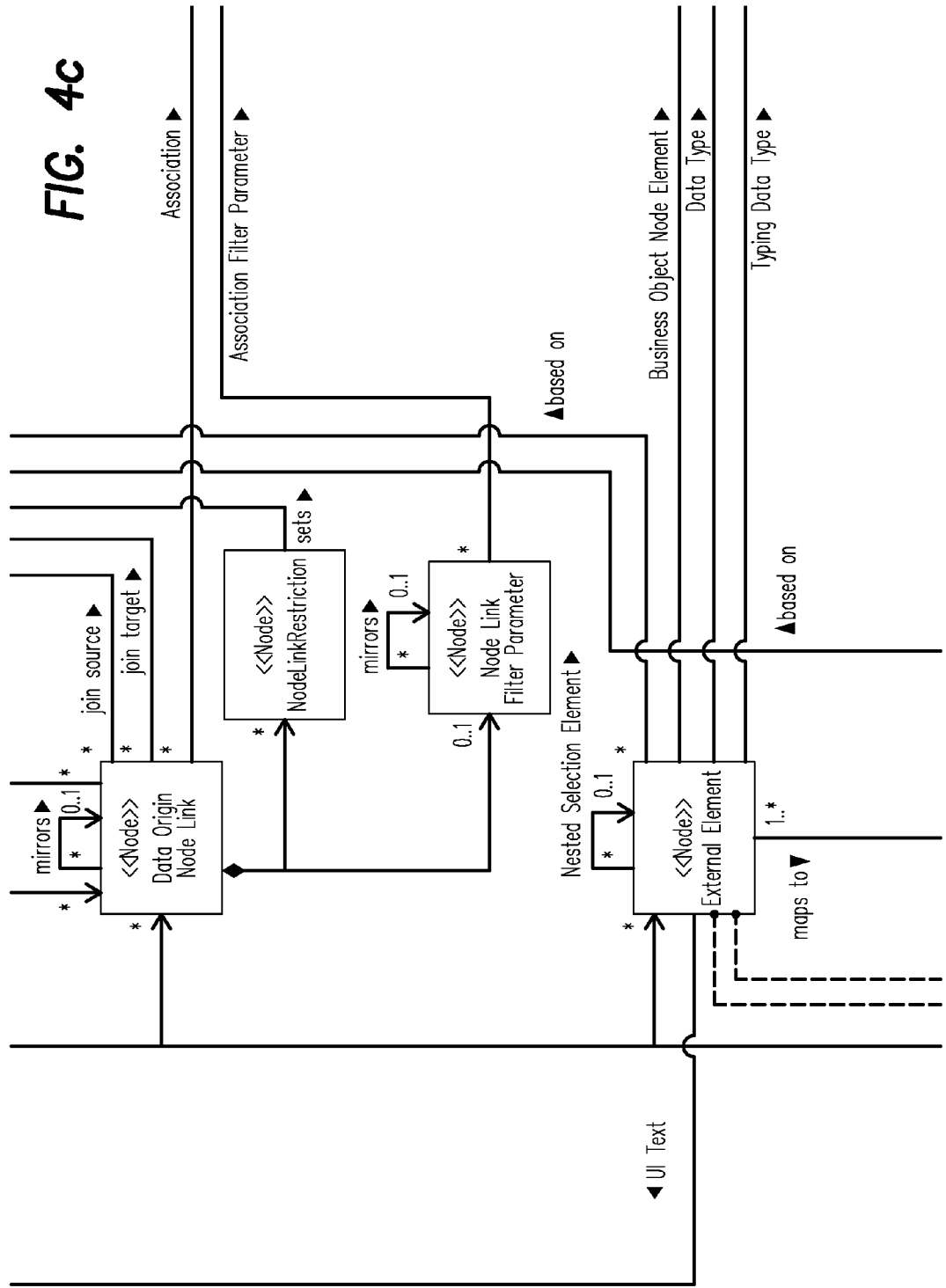
Figure 4E:
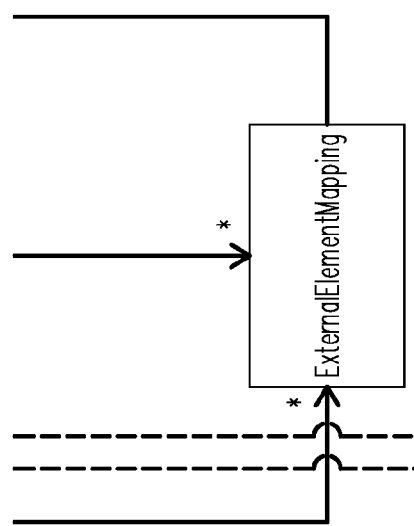

As described, a QDef indicates where each of its result elements is located. In this regard, FIG. 4 is a block diagram of business object view metadata model 400 and its associations with nodes of business object object model 450 according to some embodiments. Business object view metadata model 400 may comprise a model of a QDef to define a query on business object object model 450. Accordingly, instances of business object view metadata model 400 may comprise QDefs which define queries on instances of business object object model 450.

For each result element of a query, object model 400 includes a path to a corresponding business object node and business object node element at which the result elements is located. Specifically, object model 400 includes a Data Origin Node node to identify a node of business object object model 450 which includes a result element of a query, and a Data Origin Node Element node to identify a node element of business object object model 450 which includes the result element of the query.

Business object object model 450 may support several paths to navigate from one node to another one. Accordingly, Data Origin Node Link node of business object view metadata model 400 allows identification of a unique relation of the different nodes which are declared as origin nodes in the Data Origin Node node.

External Element node of model 400 contains the flat structure of result elements mentioned above. Each result element relates to its origin in the Data Origin Node Elements node via the External Element Mapping node. The External Element node of model 400 also specifies (i.e., using the Data Origin Node Elements node via the External Element Mapping node) which business object node elements contain the query conditions. (e.g., the "WHERE" conditions).

Business object view metadata model 400 may be nested in principle to enable reuse, (e.g., a business partner business object view metadata model may be reused in a SalesOrder QDef several times: for the buyer role, seller role, ship-to role, etc.). This reuse may be reflected in the Nested Query Definition Mapping node. Moreover, Union and Join filters, and other filters may be described in the Data Origin Node Element Union Mapping node and the Node Link Filter Parameter node, respectively.

According to some embodiments, business object view model 400 provides model-based access to all business object elements making use of corresponding frameworks. Development of an abstraction layer for search, query, reporting and/or analytics as described above may therefore no longer be necessary.

Model 400 also supports the definition of calculated fields or indirect search elements (i.e., where search is based on a derived field which is indirectly related to a database field) in the same model. These definitions may be reflected in the respective elements (fields) of the Data Origin Node Element node, the External Elements node and an external Transformation Definition node.

Figure 5C:
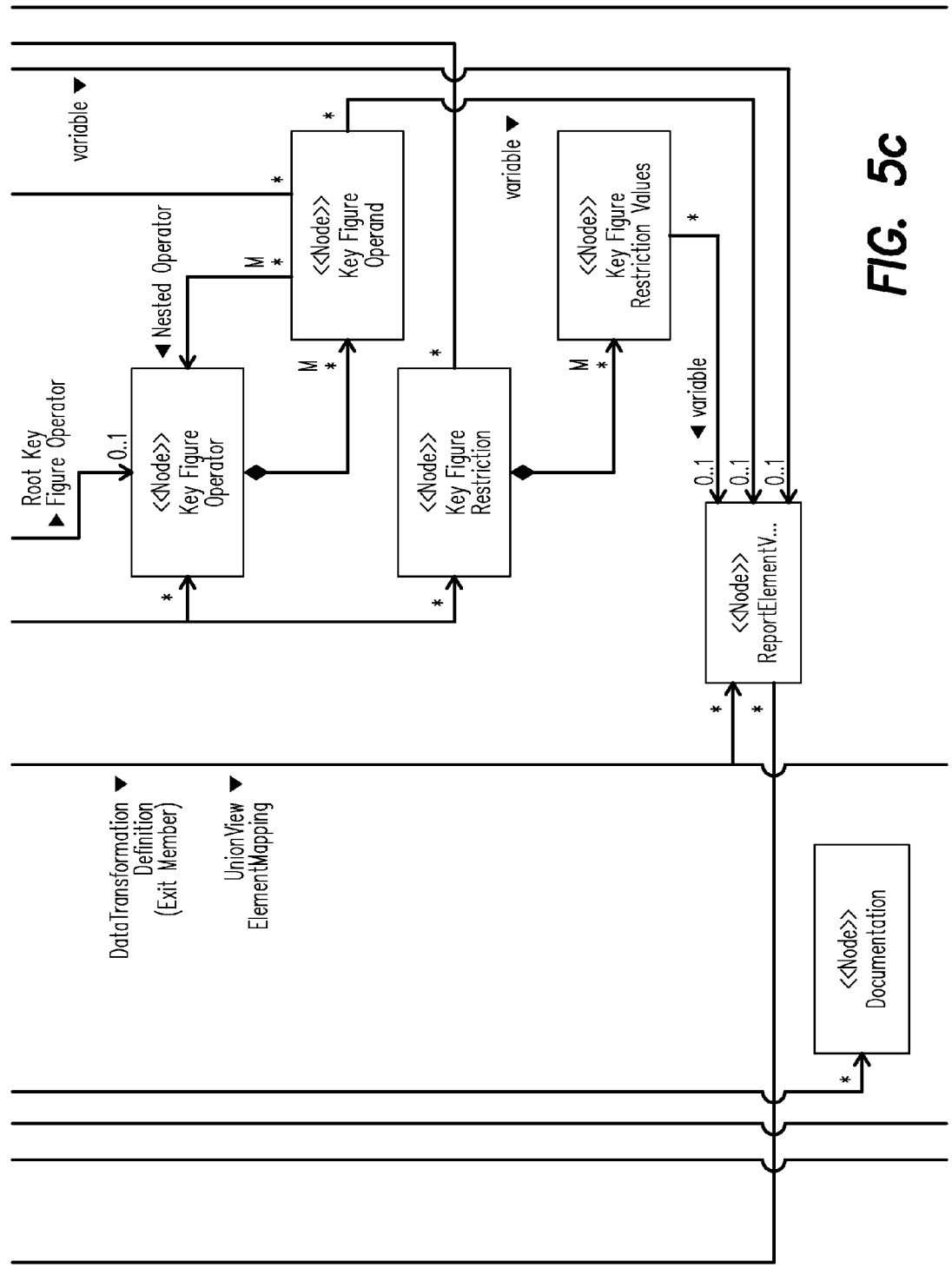
FIG. 5 is a diagram of a multi-dimensional analytical view object model according to some embodiments.
Figure 5D:
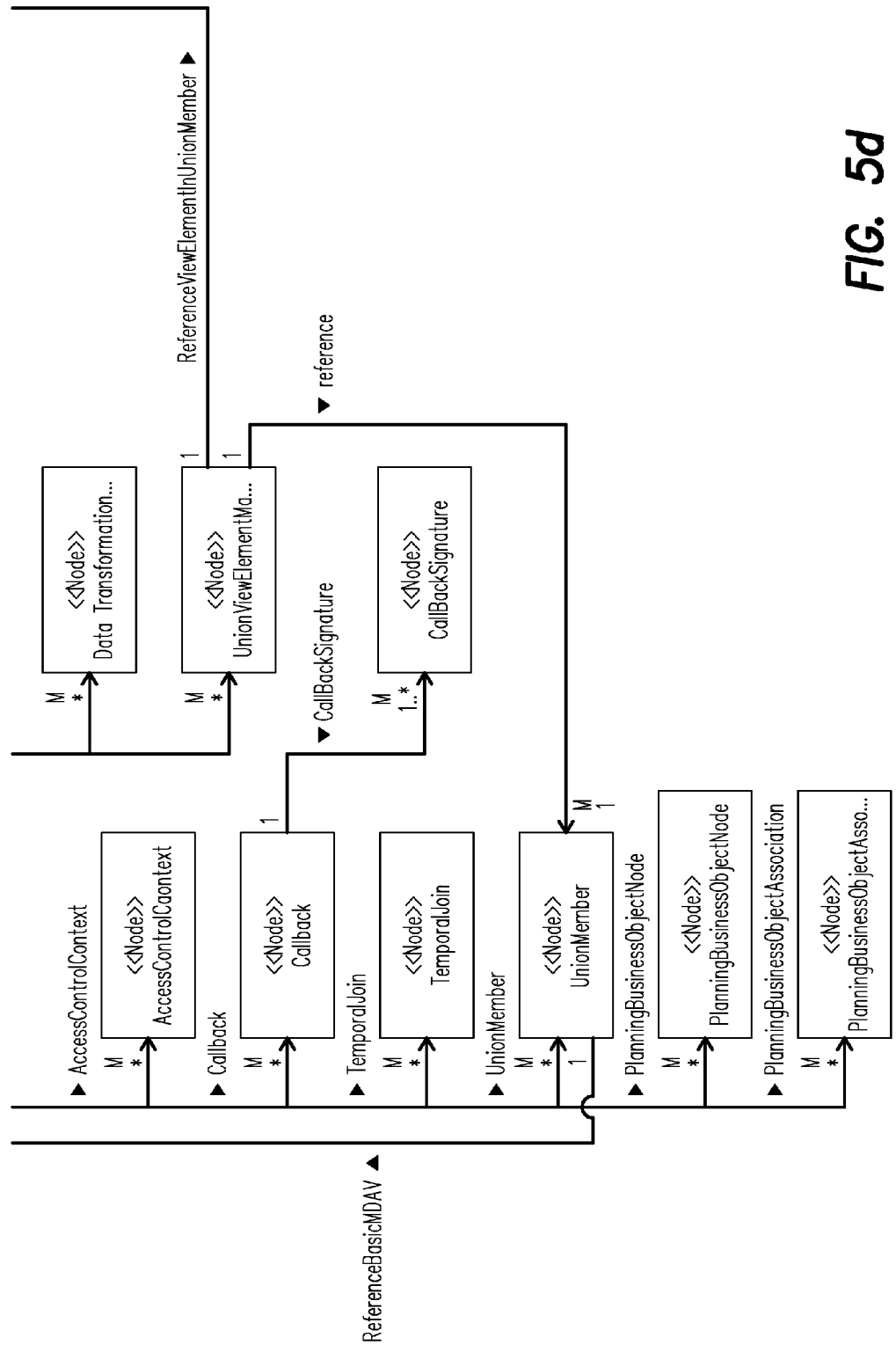

In some scenarios, multi-dimensional analysis of flat result data is desired. Multi-dimensional analytical view (MDAV) metadata model 500 of FIG. 5 has been developed to provide metadata to support such analysis. As shown, MDAV metadata model 500 is associated with business object view model 400 through a link to an Elements node, which represents a subset of the External Elements node.

The Key Figure node of model 500 allows a result element of the External Elements node to be identified as a key figure for analysis. Similarly, the Characteristics node of model 500 allows a result element of the External Elements node to be identified as a characteristic for analysis. In some embodiments, several characteristics can be defined as a dimension using the Dimension node (e.g., the dimension TIME may consist of year, quarter and month characteristics).

Separate instances of model 500 may define extensions to model 500. Furthermore, all ID elements in a "base" instance of MDAV model 500 may be referenced by "master data MDAVs". Through this snowflake schema approach, separate data retrieval of basic data and master data referenced therein can be realized. Also, a high level of reuse can be achieved for all master data MDAV metadata model instances.

An instance of a master data MDAV metadata model may be implemented in several business and authorization contexts (e.g. different sales data may be reported in a sales context vs. a financial context). Therefore, an MDAV model instance may contain several access control contexts which will become unique when a report is assigned to a specific business user interface (i.e., context).

MDAV metadata model 500 also includes a schema to define rules which are used to calculate key figures (i.e., the Key Figure Operator node and the Key Figure Operand node). The Key Figure Restriction node and the Key Figure Restriction Values node can be used to define restrictions which will be used at runtime to set predefined filter parameters.

By virtue of embodiments of the foregoing, each of search, query, reporting and analytics domains can use a same metadata model of a query definition (i.e., a business object view metadata model). Accordingly, runtime frameworks of each domain can also be based on the same runtime interfaces. Moreover, each metadata model described herein can be stored in a common metadata repository in order to leverage associations between these metadata models.

Figure 6:
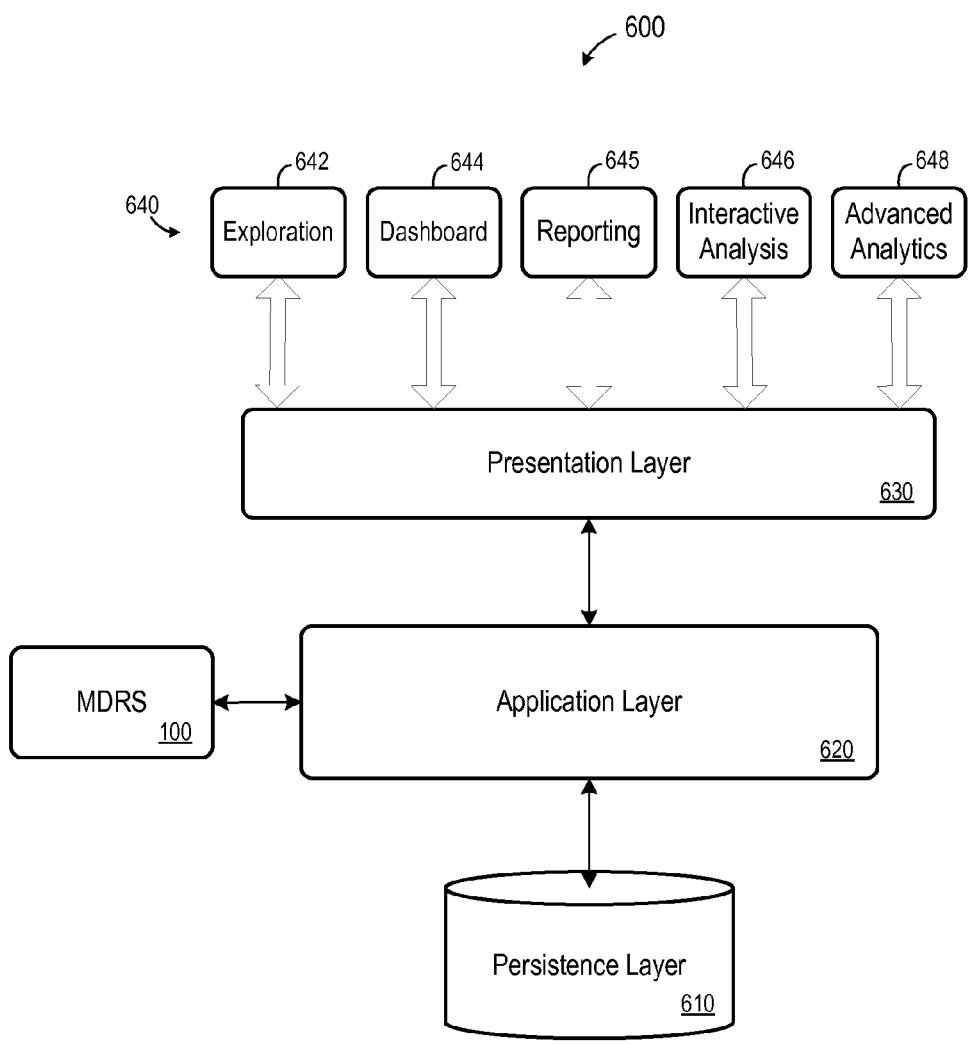
FIG. 6 is a block diagram of a runtime system according to some embodiments.

FIG. 6 is a block diagram of runtime system 600 according to some embodiments. System 600 includes persistence layer 610 which may comprise a relational database system as is known in the art. However, embodiments are not limited thereto. Persistence layer 610 may store object model instance data (e.g., SalesOrder 4711) for customer consumption.

Application layer 620 provides access to data stored in persistence layer 610. Application layer 620 accesses the data based on metadata of MDRS 100. Application layer 620 may also include business logic for providing business functions based at least in part on the data of persistence layer 610.

Presentation layer 630 provides user interfaces for accessing data of persistence layer 610 and/or functions provided by business logic via application layer 620. Consumers 640 access presentation layer 630 to retrieve data of persistence layer 610 and to host either the user interfaces provided by presentation layer 630 or their own interfaces to present information to an operator based on the retrieved data.

Each of consumers 640 may leverage instances of a business object view metadata model and, if needed, instances of a multi-dimensional analytical view to provide one or more of search, query, reporting and analytics functions. For example, exploration consumer 642 may comprise SAP BusinessObjects Explorer® to search business object data, dashboard consumer 644 may comprise SAP BusinessObjects Xcelsius® to provide dashboards driven by business object data, reporting consumer 644 may comprise SAP BusinessObjects Crystal Reports® to provide reports on business object data, interactive analysis consumer 646 may comprise SAP BusinessObjects Web Intelligence® to provide analysis of business object data, and advanced analytics consumer 648 may comprise SAP BusinessObjects Voyager® to provide advanced analytics based on business object data.

Figure 7:
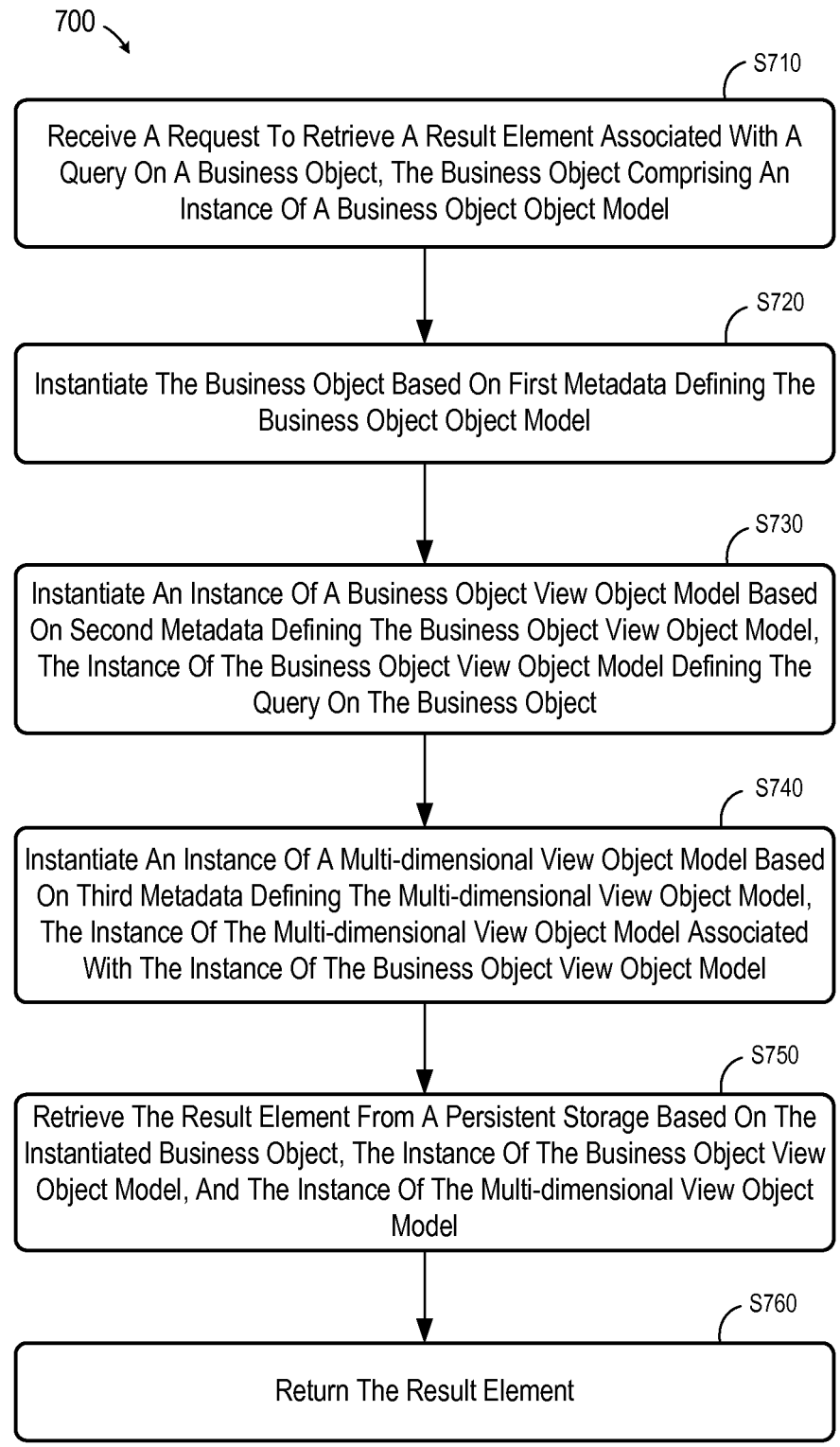
FIG. 7 is a flow diagram of a process according to some embodiments.

FIG. 7 is a flow diagram of process 700 to serve a consumer request for data according to some embodiments. Process 700 may be performed by system 600 according to some embodiments. A processor may execute program code to cause performance of process 700.

Initially, at S710, a request is received to retrieve a result element associated with a query on a business object, wherein the business object comprises an instance of a business object object model. For example, one of consumers 640 may desire to run a specific query on a business object, and application layer 620 may receive a corresponding request from presentation layer 630.

In response, at S720, application layer 620 uses services of metadata repository 100 to instantiate the business object based on first metadata defining the business object object model. The first metadata may be stored in a persistency of repository 100 as described above. Next, at S730, an instance of a business object view object model is instantiated based on second metadata defining the business object view object model. The instance of the business object view object model defines the query on the business object as described herein, and the second metadata (i.e. defining the business object view object model) may also be stored in metadata repository 100.

According to some embodiments, an instance of a multi-dimensional analytical view object model is then instantiated at S740 based on third metadata defining the multi-dimensional analytical view object model. The instance of the multi-dimensional analytical view object model is associated with the instance of the business object view object model. S740 may be omitted if analysis provided by the multi-dimensional analytical view metadata model is not required.

The result element is retrieved from a persistent storage at S750 based on the instantiated business object, the instance of the business object view object model, and the instance of the multi-dimensional analytical view object model, and is returned to the requestor at S760.

Figure 8:
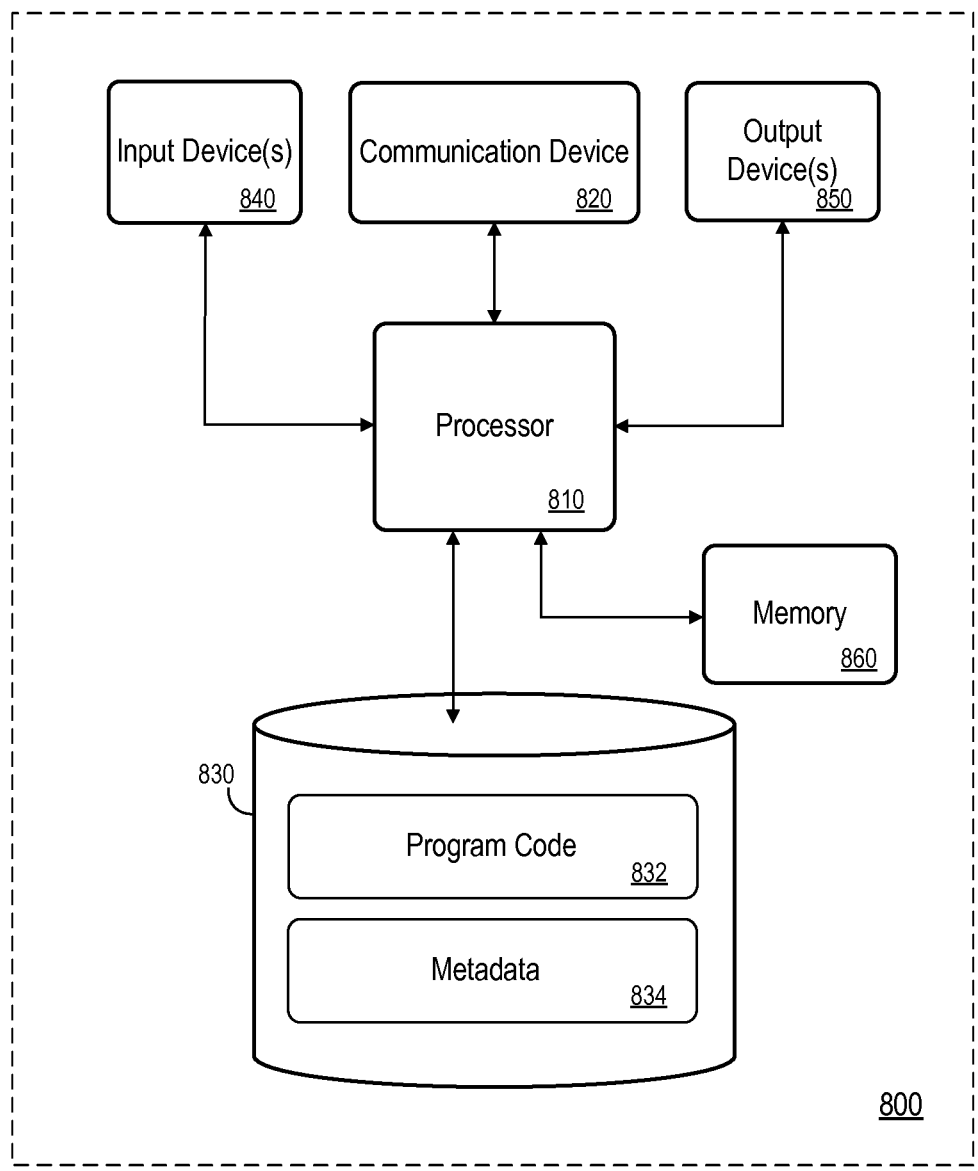
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of system 600. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as an external design tool. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 80 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code 832 may be executed by processor 810 to cause apparatus 800 to perform any one or more of the processes described herein. Embodiments are not limited to execution of these processes by a single apparatus. Metadata 834 may include metadata defining metadata models (e.g., of metadata model layer 110) and instances thereof (e.g., of object model persistency 130) as described herein. Data storage device 830 may also store data and other program code for providing additional functionality and/or which are necessary for operation thereof, such as device drivers, operating system files, etc.

Each system and device described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media and executed by a processor. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A metadata repository comprising:
    a storage system to store:
       first metadata defining a BO (business object) object model;
       a business object comprising an instance of the BO object model; and
       second metadata defining a first object model to define a query on the BO object model,
       wherein the first object model is an instance of a business object view metadata model,
       wherein the BO object model is an instance of a business object metadata model;
       wherein the business object view metadata model is separate from and different than the business object metadata model;
       wherein the business object view metadata model and the business object metadata model are instances of a same meta-metadata model;
       wherein the first object model that is an instance of the business object view metadata model includes a query definition to define the query on the BO object model, the query definition to define the query on the BO object model specifying: an item ID from an item node, a root ID from a root node, and a description text from a description node; and
       wherein the meta-metadata model and the business object metadata model are identical, wherein the business object metadata model comprises an instance of itself.

2. The metadata repository according to claim 1, wherein the first object model comprises a Data Origin Node node to identify a node of the BO object model which includes a result element of the query, and
    wherein the object model of the view comprises a Data Origin Node Element node to identify a node element of the BO object model which includes the result element of the query.

3. The metadata repository according to claim 2, wherein the first object model comprises an External Element node to store the result element, and
    wherein the External Element node is to store a search condition of the query.

4. The metadata repository according to claim 1, the storage system to further store:
    third metadata defining a second object model to define a view on a result node of the first object model,
    wherein the second object model is an instance of a multi-dimensional analytical view metadata model.

5. The metadata repository according to claim 4, wherein the business object view metadata model, the multi-dimensional analytical view metadata model and the business object metadata model are instances of the same meta-metadata model.

6. The metadata repository according to claim 5, wherein the storage system includes a metadata model layer that includes the multi-dimensional analytical view metadata model, the business object view metadata model and the business object metadata model.

7. A metadata repository according to claim 4, wherein the first object model comprises an External Element node to store a result element of the query, and
    wherein the second object model comprises:
       a Key Figure node to identify a result element of the External Element node as a key figure;
       a Characteristic node to identify a result element of the External Element node as a characteristic; and
       a Dimension node to identify a characteristic as a dimension.

8. The metadata repository according to claim 7, wherein the second object model comprises:
    a Key Figure Operator node to define a calculation on a key figure.

9. The metadata repository according to claim 1, wherein the storage system includes a metadata model layer that includes the business object view metadata model and the business object metadata model.

10. A non-transitory computer-readable medium storing one or more programs comprising instructions, which when executed by a device, cause the device to:
    receive a request to retrieve a result element associated with a query on a business object, the business object comprising an instance of a BO (business object) object model;
    instantiate the business object based on first metadata defining the BO object model;
    instantiate an instance of a business object view object model based on second metadata defining the business object view object model, the instance of the business object view object model defining the query on the business object; and
    retrieve the result element from a persistent storage based on the instantiated business object and the instance of the business object view object model;
    wherein the business object view object model is an instance of a business object view metadata model;
    wherein the BO object model is an instance of a business object metadata model;
    wherein the business object view metadata model is separate from and different than the business object metadata model;
    wherein the business object view metadata model and the business object metadata model are instances of a same meta-metadata model;
    wherein the business object view object model that is an instance of the business object view metadata model includes a query definition to define the query on the business object that comprises the instance of the BO object model, the query definition to define the query on the business object specifying: an item ID from an item node, a root ID from a root node, and a description text from a description node; and
    wherein the meta-metadata model and the business object metadata model are identical, wherein the business object metadata model comprises an instance of itself.

11. The medium according to claim 10, wherein the instance of the business object view object model comprises a Data Origin Node node identifying a node of the business object which includes the result element of the query,
    wherein the instance of the business object view object model comprises a Data Origin Node Element node identifying a node element of the business object which includes the result element of the query, wherein the instance of the business object view object model comprises an External Element node storing the result element, and wherein the External Element node stores a search condition of the query.

12. The medium according to claim 10, the one or more programs further comprising instructions, which when executed by the device, cause the device to:

instantiate an instance of a multi-dimensional analytical view object model based on third metadata defining the multi-dimensional analytical view object model, the instance of the multi-dimensional analytical view object model associated with the instance of the business object view object model, wherein retrieval of the data from the persistent storage is based on the instantiated business object, the instance of the business object view object model, and the instance of the multi-dimensional analytical view object model.

13. The medium according to claim 12, wherein the multi-dimensional analytical view object model is an instance of a multi-dimensional analytical view metadata model, and wherein the business object view metadata model, the business object metadata model and the multi-dimensional analytical view metadata model are instances of the meta-metadata model.

14. The medium according to claim 13, wherein the business object view metadata model is a business object view metadata model in a metadata model layer;

wherein the business object metadata model is a business object metadata model in the metadata model layer; and wherein the multi-dimensional analytical view metadata model is a multi-dimensional analytical view metadata model in the metadata model layer.

15. The medium according to claim 12, wherein the instance of the business object view object model comprises an External Element node storing the result element of the query, and wherein the multi-dimensional analytical view object model comprises:

a Characteristic node identifying the result element of the External Element node as a characteristic; and a Dimension node identifying a characteristic as a dimension.

16. The medium according to claim 12, wherein the instance of the business object view object model comprises an External Element node storing the result element of the query, and wherein the multi-dimensional analytical view object model comprises:

a Key Figure node identifying the result element of the External Element node as a key figure; and a Key Figure Operator node defining a calculation on the key figure.

17. The medium according to claim 10, wherein the business object view metadata model is a business object view metadata model in a metadata model layer; and wherein the business object metadata model is a business object metadata model in the metadata model layer.

18. A computer-implemented method comprising:

receiving a request to retrieve a result element associated with a query on a business object, the business object comprising an instance of a BO (business object) object model;

instantiating the business object based on first metadata defining the BO object model;

instantiating an instance of a business object view object model based on second metadata defining the business object view object model, the instance of the business object view object model defining the query on the business object; and retrieving the result element from a persistent storage based on the instantiated business object and the instance of the business object view object model;

wherein the business object view object model is an instance of a business object view metadata model;

wherein the BO object model is an instance of a business object metadata model;

wherein the business object view metadata model is separate from and different than the business object metadata model;

wherein the business object view metadata model and the business object metadata model are instances of a same meta-metadata model;

wherein the business object view object model that is an instance of the business object view metadata model includes a query definition to define the query on the business object that comprises the instance of the BO object model, the query definition to define the query on the business object specifying: an item ID from an item node, a root ID from a root node, and a description text from a description node; and wherein the meta-metadata model and the business object metadata model are identical, wherein the business object metadata model comprises an instance of itself.

19. The method according to claim 18, wherein the instance of the business object view object model comprises a Data Origin Node node identifying a node of the business object which includes the result element of the query, wherein the instance of the business object view object model comprises a Data Origin Node Element node identifying a node element of the business object which includes the result element of the query, wherein the instance of the business object view object model comprises an External Element node storing the result element, and wherein the External Element node stores a search condition of the query.

20. The method according to claim 18, further comprising:

instantiating an instance of a multi-dimensional analytical view object model based on third metadata defining the multi-dimensional analytical view object model, the instance of the multi-dimensional analytical view object model associated with the instance of the business object view object model, wherein retrieval of the data from the persistent storage is based on the instantiated business object, the instance of the business object view object model, and the instance of the multi-dimensional analytical view object model.

21. The method according to claim 20, wherein the instance of the business object view object model comprises an External Element node storing the result element of the query, and wherein the multi-dimensional analytical view object model comprises:

a Characteristic node identifying the result element of the External Element node as a characteristic; and a Dimension node identifying a characteristic as a dimension.

22. The method according to claim 20, wherein the instance of the business object view object model comprises an External Element node storing the result element of the query, and wherein the multi-dimensional analytical view object model comprises:

a Key Figure node identifying the result element of the External Element node as a key figure; and a Key Figure Operator node defining a calculation on the key figure.

23. The method according to claim 18, wherein the business object view metadata model is a business object view metadata model in a metadata model layer; and wherein the business object metadata model is a business object metadata model in the metadata model layer.

24. The method according to claim 18, further comprising:

instantiating an instance of a multi-dimensional analytical view object model based on third metadata defining the multi-dimensional analytical view object model, the instance of the multi-dimensional analytical view object model associated with the instance of the business object view object model;

wherein retrieval of the data from the persistent storage is based on the instantiated business object, the instance of the business object view object model, and the instance of the multi-dimensional analytical view object model;

wherein the multi-dimensional analytical view object model is an instance of a multi-dimensional analytical view metadata model, wherein the business object view metadata model, the business object metadata model and the multi-dimensional analytical view metadata model are instances of the same meta-metadata model;

wherein the business object view metadata model is a business object view metadata model in a metadata model layer;

wherein the business object metadata model is a business object metadata model in the metadata model layer; and wherein the multi-dimensional analytical view metadata model is a multi-dimensional analytical view metadata model in the metadata model layer.

\* \* \* \* \*